(12) United States Patent
Zhou

(10) Patent No.: US 8,503,171 B2
(45) Date of Patent: Aug. 6, 2013

(54) MOUNTING APPARATUS FOR EXPANSION CARDS

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/249,259

(22) Filed: Sep. 30, 2011

(65) Prior Publication Data

US 2013/0050926 A1    Feb. 28, 2013

(30) Foreign Application Priority Data

Aug. 30, 2011  (CN) .............................. 201110252854

(51) Int. Cl.
  *G06F 1/16*    (2006.01)
(52) U.S. Cl.
  USPC .................... 361/679.31; 439/142; 248/278.1
(58) Field of Classification Search
  USPC ............ 312/312, 325, 223.1, 223.2; 361/759, 361/721, 807, 737, 801, 679.32, 679.55, 361/679.01, 679.31, 679.58, 679.27, 679.35, 679.56, 679.33, 679.43, 679.29, 679.26, 679.54, 679.28, 679.41; 439/67, 159, 132, 157, 733.1, 439/142, 441, 35; 248/206.2, 278.1, 279.1, 248/157, 550, 214; 174/354, 50, 451, 355

See application file for complete search history.

(56) References Cited

U.S. PATENT DOCUMENTS

| | | | |
|---|---|---|---|
| 6,935,868 B1 * | 8/2005 | Campini et al. | 439/67 |
| 2009/0055567 A1 * | 2/2009 | Chen et al. | 710/302 |
| 2009/0296358 A1 * | 12/2009 | Tsai | 361/759 |

* cited by examiner

*Primary Examiner* — Hung Duong
(74) *Attorney, Agent, or Firm* — Altis Law Group, Inc.

(57) ABSTRACT

A mounting apparatus for mounting expansion cards to expansion slots set on a circuit board includes a bracket and a number of mounting members. The bracket includes two racks opposite to each other and fixed to the circuit board. A number of spaced bars extend from the mounting piece. Each mounting member includes a fixing plate fixed to a corresponding bar, a locking portion extending from a top of the fixing portion. Two parallel raised portions protrude on an inner surface of the fixing plate to sandwich a corresponding end of the corresponding expansion card. The locking portion abuts against the top of the corresponding expansion card.

15 Claims, 3 Drawing Sheets

MOUNTING APPARATUS FOR EXPANSION CARDS

BACKGROUND

1. Technical Field

The disclosure relates to an apparatus for mounting expansion cards.

2. Description of Related Art

Computer systems include expansion cards to expand the capability of the computer systems. Expansion cards are mounted to expansion slots of the computer systems, which are easily damaged when the computer systems receive an electrical shock.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
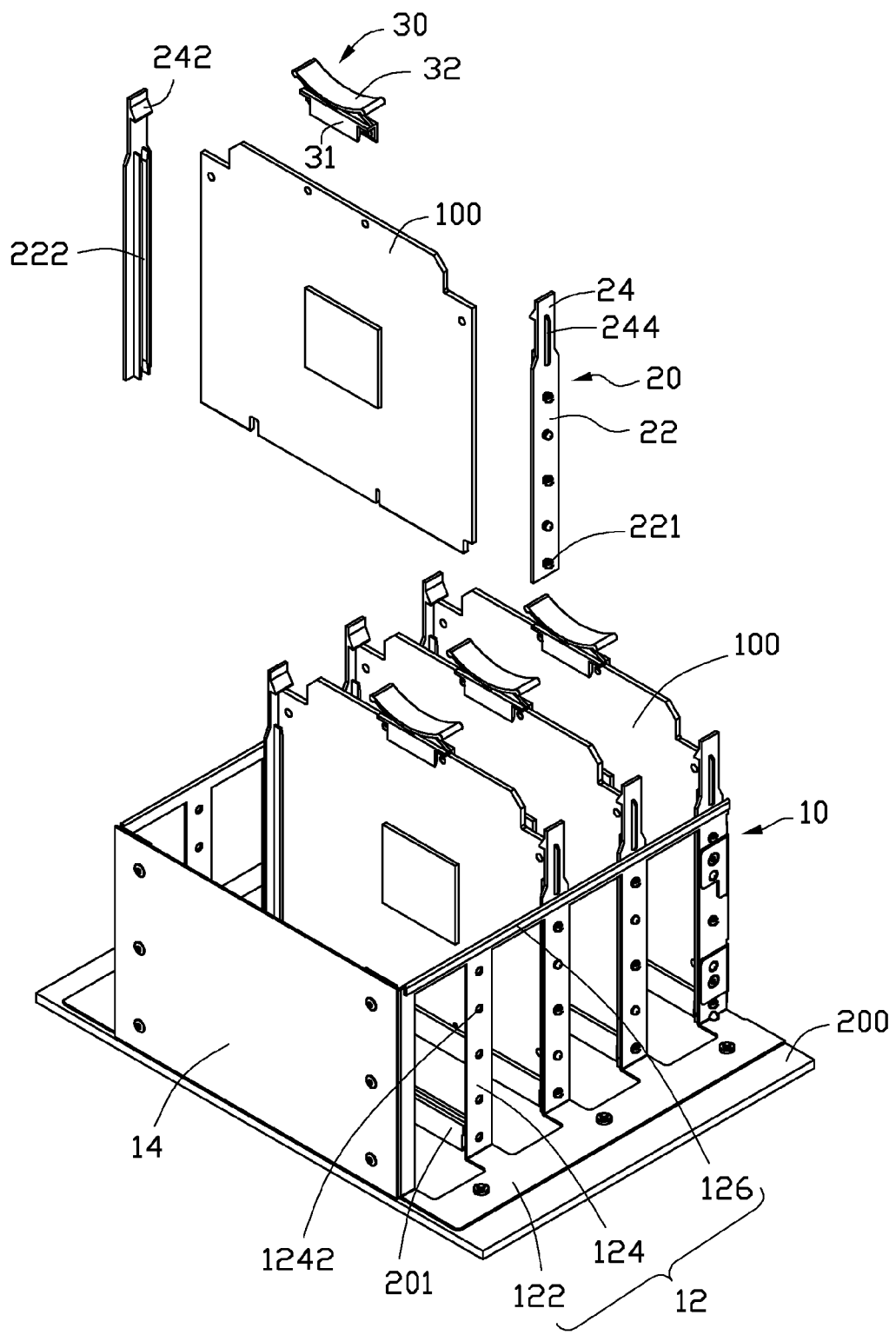
FIG. 1 is an exploded, isometric view of an exemplary embodiment of a mounting apparatus, together with a plurality of expansion cards.

Referring to FIG. 1, an exemplary embodiment of a mounting apparatus is provided to mount a plurality of expansion cards 100 to a circuit board 200 of an electronic device, such as a computer. The circuit board 200 includes a plurality of expansion slots 201 formed on the circuit board 200. The mounting apparatus includes a bracket 10 and a plurality of mounting members 20.

The bracket 10 is fixed on the circuit board 200 around the plurality of expansion slots 201. The bracket 10 includes two opposite supporting racks 12 and a side plate 14 connected in a substantially perpendicular manner between corresponding sides of the supporting racks 12. Each supporting rack 12 includes a mounting piece 122 fixed to the circuit board 200, a plurality of spaced and parallel bars 124 extending up in a substantially perpendicular manner from one side of the mounting piece 122, and a connecting piece 126 connecting the tops of the bars 124. The mounting pieces 122 are fixed to the circuit board 200 beside the expansion slots 201 by screwing or riveting. The bars 124 face and align with the corresponding expansion slots 201. Each bar 124 defines a plurality of mounting holes 1242 from top to bottom.

Each mounting member 20 includes a fixing plate 22 and a locking portion 24 formed from a top end of the fixing plate 22. A plurality of pegs 221 protrude on an outer surface of the fixing plate 22 from up to bottom. Two elongated raised portions 222 protrude on an inner surface of the fixing plate 22 from up to bottom, parallel to each other. A block 242 protrudes on an inner side of the locking portion 24. A reinforcing rib 244 protrudes on an outer side of the locking portion 24.

A handle 30 is fixed to a top of each expansion card 100. The handle 30 includes a clipping portion 31 clipping the top of the expansion card 100 and an arc-shaped operation portion 32.

Figure 2:
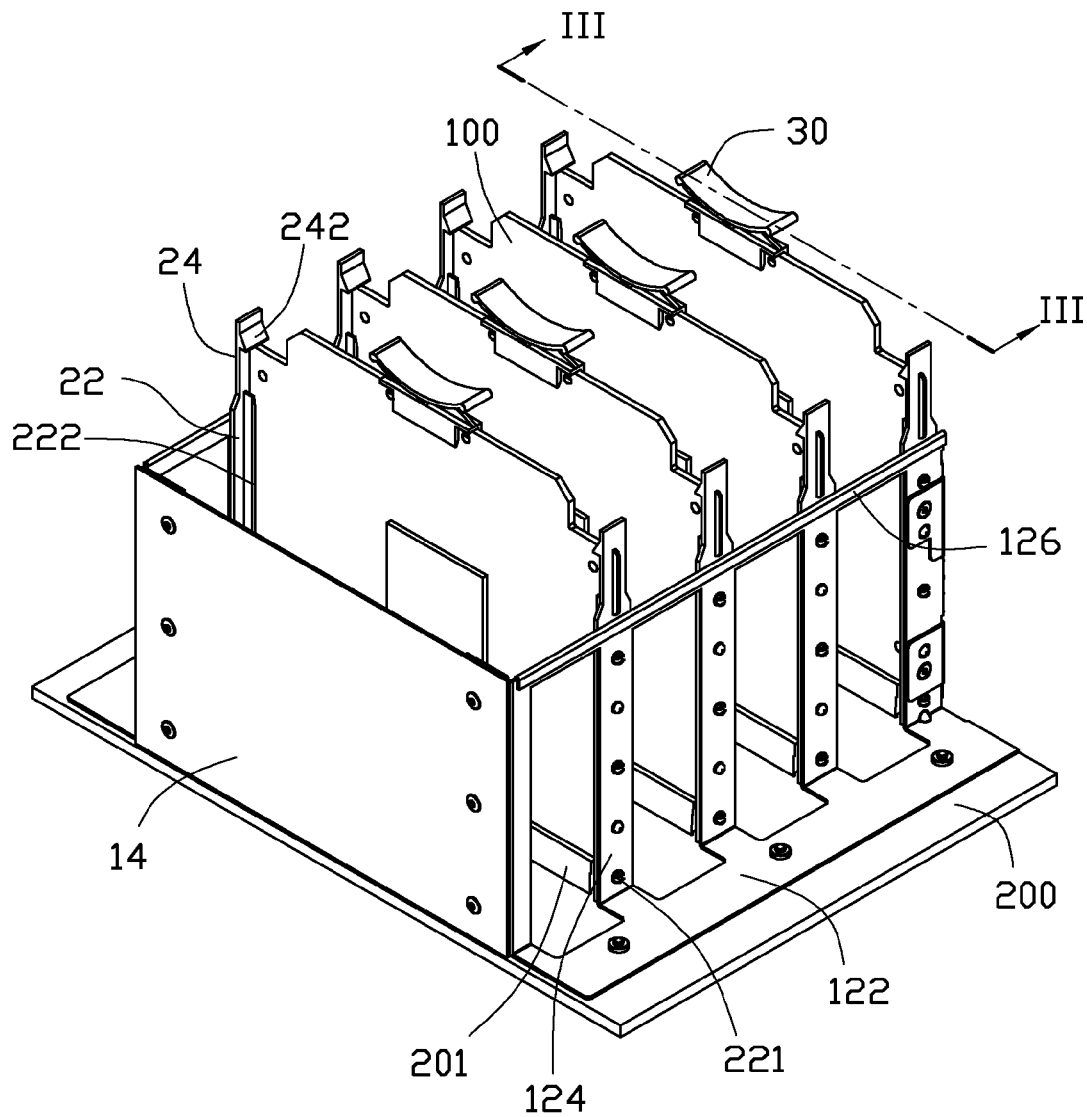
FIG. 2 is an assembled, isometric view of FIG. 1.
Figure 3:
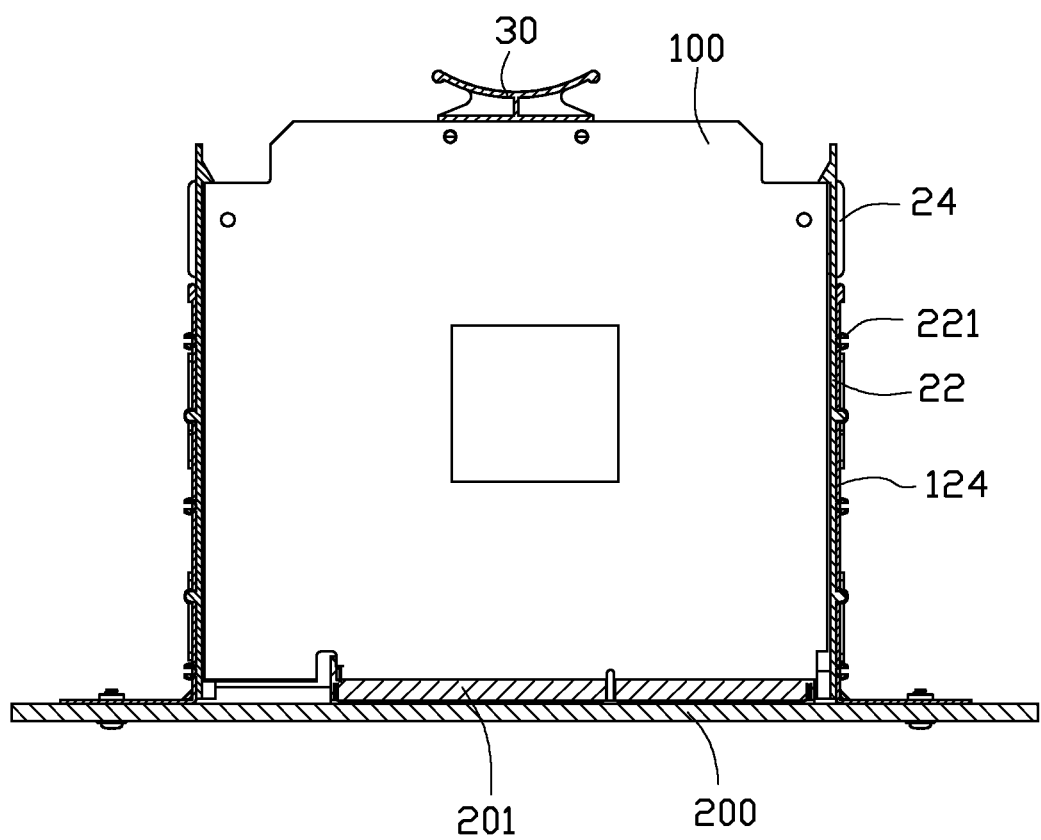
FIG. 3 is a cross-sectional view of FIG. 2, taken along the line of III-III.

Referring to FIGS. 2 and 3, in assembly, the mounting pieces 20 are fixed to inner surfaces of the corresponding bars 124 through the pegs 221 fixed in the mounting holes 1242. The locking portions 24 are located above the corresponding bars 124. The expansion cards 100 are inserted in the corresponding expansion slots 201. Each of two opposite ends of each expansion card 100 is locked between the raised portions 222 of the corresponding mounting member 20. The block 242 presses the top of each expansion card 100.

To detach each expansion card 100, two opposite mounting members 20 are deformed out to release the locking portions 24 from the expansion card 100. The operation portion 32 is pulled to detach the corresponding expansion card 100.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for mounting a plurality of expansion cards to a plurality of expansion slots of a circuit board, the mounting apparatus comprising:
   a bracket comprising two opposite supporting racks, wherein each of the supporting racks comprises a mounting piece for being fixed to the circuit board, a plurality of spaced and parallel bars extending up from the mounting piece; and
   a plurality of mounting members, wherein each of the mounting members comprises a fixing plate fixed to an inner side of a corresponding one of the bars and a locking portion formed from a top of the fixing plate, two elongated raised portions protrude on an inner surface of the fixing plate to sandwich a corresponding end of the corresponding expansion card, the locking portion presses a top of the corresponding expansion card when the corresponding expansion card is mounted by the mounting member.

2. The mounting apparatus of claim 1, wherein the bracket further comprises a side plate connected between corresponding sides of the supporting racks.

3. The mounting apparatus of claim 1, wherein each of the supporting racks further comprises a connecting piece connecting the tops of the bars.

4. The mounting apparatus of claim 1, wherein each of the bars defines a plurality of mounting holes from up to bottom, a plurality of pegs protrudes on an outer surface of the corresponding mounting member from up to bottom, the mounting member is fixed to the corresponding bar through the pegs being fixed in the mounting holes.

5. The mounting apparatus of claim 1, wherein a block protrudes on an inner side of the locking portion to press the top of the corresponding expansion card.

6. The mounting apparatus of claim 1, wherein a reinforcing rib protrudes on an outer side of each of the locking portions.

7. The mounting apparatus of claim 6, wherein each of the locking portions is located above the corresponding bar.

8. An electronic device comprising:
a circuit board comprising a plurality of expansion slots;
a plurality of expansion cards inserted in the expansion slots;
a bracket comprising two supporting racks, wherein each of the supporting racks comprises a mounting piece fixed to the circuit board on one of opposite sides of the expansion slots, a plurality of spaced bars extending up from the mounting piece and aligning with the expansion slots; and
a plurality of mounting members, wherein each of the mounting members comprises a fixing plate fixed to an inner side of a corresponding one of the bars and a locking portion formed at a top of the fixing plate, two parallel and raised portions protrude on an inner surface of the fixing plate and sandwich a corresponding end of the corresponding expansion card, the locking portion presses a top of the corresponding expansion card.

9. The electronic device of claim 8, wherein the bracket further comprises a side plate connected between corresponding sides of the supporting racks.

10. The electronic device of claim 9, wherein each of the bars defines a plurality of mounting holes from up to bottom, a plurality of pegs protrudes on an outer surface of the mounting member from up to bottom, the mounting member is fixed to the corresponding bar through the pegs fixed in the mounting holes.

11. The electronic device of claim 8, wherein each of the supporting racks further comprises a connecting piece connecting the tops of the bars.

12. The electronic device of claim 8, wherein a block protrudes on an inner side of the locking portion to press the top of the corresponding expansion card.

13. The electronic device of claim 8, wherein a reinforcing rib protrudes on an outer side of each of the locking portions.

14. The electronic device of claim 13, wherein each of the locking portions is located above the corresponding bar.

15. The electronic device of claim 8, wherein a handle is fixed to a top of each of the expansion cards for operating the corresponding expansion card.

* * * * *